United States Patent
Malladi et al.

(10) Patent No.: US 10,588,101 B2
(45) Date of Patent: Mar. 10, 2020

(54) LONG TERM EVOLUTON (LTE) USER EQUIPMENT RELAYS HAVING A LICENSED WIRELESS OR WIRED BACKHAUL LINK AND AN UNLICENSED ACCESS LINK

(71) Applicant: QUALCOMM Incorporated, San Diego, CA (US)

(72) Inventors: Durga Prasad Malladi, San Diego, CA (US); Yongbin Wei, San Diego, CA (US); Gavin B. Horn, San Diego, CA (US); Aleksandar Damnjanovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1302 days.

(21) Appl. No.: 13/733,683

(22) Filed: Jan. 3, 2013

(65) Prior Publication Data
US 2013/0176934 A1    Jul. 11, 2013

Related U.S. Application Data

(60) Provisional application No. 61/584,014, filed on Jan. 6, 2012.

(51) Int. Cl.
*H04W 24/02*    (2009.01)
*H04W 56/00*    (2009.01)
(Continued)

(52) U.S. Cl.
CPC ......... *H04W 56/001* (2013.01); *H04W 16/26* (2013.01); *H04W 56/002* (2013.01);
(Continued)

(58) Field of Classification Search
CPC .................................................... H04W 56/001
See application file for complete search history.

(56) References Cited

U.S. PATENT DOCUMENTS 6,909,705 B1    6/2005 Lee et al.
7,623,879 B2 *  11/2009 Honkanen et al. ........... 455/501
(Continued)

FOREIGN PATENT DOCUMENTS

CN    1582590 A    2/2005
CN    1886920 A    12/2006
(Continued)

OTHER PUBLICATIONS

International Search Report and Written Opinion—PCT/US2013/020200—ISA/EPO—dated Apr. 9, 2013.
(Continued)

*Primary Examiner* — Brandon M Renner
(74) *Attorney, Agent, or Firm* — Patterson & Sheridan, LLP

(57) ABSTRACT

Certain aspects of the present disclosure provide methods and apparatus for employing relaying devices, such as Long Term Evolution (LTE) user equipment (UE) relays, having a licensed wireless or wired backhaul link and an unlicensed access link. One method generally includes receiving, at a first device, data from a first apparatus via a first carrier frequency in a licensed spectrum, wherein the first device comprises a relaying device, and relaying the data to a second apparatus via a second carrier frequency in an unlicensed spectrum. In this manner, wireless communication systems with relaying devices may achieve better spectral efficiency in unlicensed access links.

44 Claims, 10 Drawing Sheets

(51) Int. Cl.
  *H04W 88/04* (2009.01)
  *H04W 16/26* (2009.01)
  *H04W 84/04* (2009.01)
  *H04B 7/155* (2006.01)

(52) U.S. Cl.
  CPC ......... *H04W 88/04* (2013.01); *H04B 7/15542* (2013.01); *H04W 84/047* (2013.01)

(56) References Cited

U.S. PATENT DOCUMENTS

| | | | |
|---|---|---|---|
| 7,962,161 B1 * | 6/2011 | Giallorenzi | H04W 48/14 455/466 |
| 2005/0136835 A1 | 6/2005 | Suwa | |
| 2005/0227616 A1 | 10/2005 | Takatani et al. | |
| 2006/0271969 A1 * | 11/2006 | Takizawa | H04W 74/0808 725/81 |
| 2008/0075178 A1 * | 3/2008 | Lappetelainen | H04B 7/155 375/260 |
| 2009/0109941 A1 * | 4/2009 | Carter | H04W 12/06 370/338 |
| 2010/0110983 A1 * | 5/2010 | Fu | H04J 11/0056 370/328 |
| 2010/0329216 A1 * | 12/2010 | Jen | H04B 7/2606 370/332 |
| 2011/0128905 A1 * | 6/2011 | Kawauchi | H04B 7/026 370/315 |
| 2011/0261767 A1 * | 10/2011 | Ji et al. | 370/329 |
| 2011/0280176 A1 | 11/2011 | Lee et al. | |
| 2012/0052855 A1 | 3/2012 | Soliman et al. | |
| 2012/0213085 A1 * | 8/2012 | Koren et al. | 370/241 |
| 2013/0137364 A1 * | 5/2013 | Redana | H04B 7/15528 455/9 |
| 2013/0137469 A1 * | 5/2013 | Schmidt | H04W 74/006 455/466 |
| 2013/0163519 A1 * | 6/2013 | Ribeiro | H04W 8/26 370/328 |
| 2013/0329692 A1 * | 12/2013 | Vrzic | H04W 72/0453 370/329 |
| 2013/0329711 A1 * | 12/2013 | Seo et al. | 370/336 |
| 2014/0140314 A1 * | 5/2014 | Wei | H04W 48/12 370/329 |
| 2015/0223257 A1 * | 8/2015 | Wilhelmsson | H04W 72/082 455/452.1 |

FOREIGN PATENT DOCUMENTS

| | | |
|---|---|---|
| EP | 2173117 A1 | 4/2010 |
| JP | 2006074672 A | 3/2006 |
| JP | 2007020233 A | 1/2007 |
| JP | 2008177969 A | 7/2008 |
| JP | 5002650 B2 | 8/2012 |
| WO | 03055246 A1 | 7/2003 |
| WO | WO-2009113129 A1 | 9/2009 |

OTHER PUBLICATIONS

Japanese Office Action dated Jun. 21, 2016, corresponding to Application No. JP2014-551325.
European Office Action dated May 17, 2016, corresponding to Application No. EP13700187.1.

* cited by examiner

LONG TERM EVOLUTON (LTE) USER EQUIPMENT RELAYS HAVING A LICENSED WIRELESS OR WIRED BACKHAUL LINK AND AN UNLICENSED ACCESS LINK

CROSS-REFERENCE TO RELATED APPLICATIONS

This application claims benefit of priority to U.S. Provisional Application Ser. No. 61/584,014, filed on Jan. 6, 2012, which is expressly incorporated by reference herein in its entirety.

BACKGROUND

Field

Certain aspects of the disclosure generally relate to wireless communications and, more particularly, to using Long Term Evolution (LTE) user equipment (UE) relays having a licensed wireless or wired backhaul link and an unlicensed access link.

Background

Wireless communication networks are widely deployed to provide various communication services such as voice, video, packet data, messaging, broadcast, etc. These wireless networks may be multiple-access networks capable of supporting multiple users by sharing the available network resources (e.g., bandwidth and transmit power). Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, $3^{rd}$ Generation Partnership Project (3GPP) Long Term Evolution (LTE) networks, and Long Term Evolution Advanced (LTE-A) networks.

A wireless communication network may include a number of base stations that can support communication with a number of user equipment devices (UEs). A UE may communicate with a base station via the downlink and uplink. The downlink (or forward link) refers to the communication link from the base station to the UE, and the uplink (or reverse link) refers to the communication link from the UE to the base station. A base station may transmit data and control information on the downlink to a UE and/or may receive data and control information on the uplink from the UE. This communication link may be established via a single-input single-output, multiple-input single-output or a multiple-input multiple-output (MIMO) system.

Wireless communication systems may comprise a donor base station that communicates with wireless terminals via a relay node, such as a relay base station. The relay node may communicate with the donor base station via a backhaul link and with the terminals via an access link. In other words, the relay node may receive downlink messages from the donor base station over the backhaul link and relay these messages to the terminals over the access link. Similarly, the relay node may receive uplink messages from the terminals over the access link and relay these messages to the donor base station over the backhaul link. The relay node may, thus, be used to supplement a coverage area and help fill "coverage holes."

SUMMARY

Certain aspects of the present disclosure generally relate to various system considerations for utilizing Long Term Evolution (LTE) user equipment (UE) relays having a licensed wireless or wired backhaul link and an unlicensed access link. LTE operation in the unlicensed spectrum may involve a series of techniques designed to avoid or at least reduce interference from non-cooperating devices operating in the same spectrum, including WiFi and other LTE devices associated with a different operator.

In an aspect of the disclosure, a method for wireless communications is provided. The method generally includes receiving, at a first device, data from a first apparatus via a first carrier frequency in a licensed spectrum, wherein the first device comprises a relaying device, and relaying the data to a second apparatus via a second carrier frequency in an unlicensed spectrum. For certain aspects, the first device and a second device may be synchronized, and the data may be relayed based on the synchronization.

In an aspect of the disclosure, a first device for wireless communications is provided, wherein the first device comprises a relaying device. The first device generally includes a receiver configured to receive data from a first apparatus via a first carrier frequency in a licensed spectrum and a transmitter configured to relay the data to a second apparatus via a second carrier frequency in an unlicensed spectrum. For certain aspects, the first device further comprises a processing system configured to synchronize the first device and a second device, and the transmitter is configured to relay the data based on the synchronization.

In an aspect of the disclosure, a first device for wireless communications is provided, wherein the first device comprises a relaying device. The first device generally includes means for receiving data from a first apparatus via a first carrier frequency in a licensed spectrum and means for relaying the data to a second apparatus via a second carrier frequency in an unlicensed spectrum. For certain aspects, the first device further comprises means for synchronizing the first device and a second device, and the means for relaying is configured to relay the data based on the synchronization.

In an aspect of the disclosure, a computer-program product for wireless communications is provided. The computer-program product generally includes a computer-readable medium having code for receiving, at a first device, data from a first apparatus via a first carrier frequency in a licensed spectrum, wherein the first device comprises a relaying device; and for relaying the data to a second apparatus via a second carrier frequency in an unlicensed spectrum. For certain aspects, the computer-readable medium has code for synchronizing the first device and a second device, and the data may be relayed based on the synchronization.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DESCRIPTION

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization is a technique. SC-FDMA has similar performance and essentially the same overall complexity as those of OFDMA system. SC-FDMA signal has lower peak-to-average power ratio (PAPR) because of its inherent single carrier structure. SC-FDMA has drawn great attention, especially in the uplink communications where lower PAPR greatly benefits the mobile terminal in terms of transmit power efficiency. It is currently a working assumption for uplink multiple access scheme in 3GPP Long Term Evolution (LTE), or Evolved UTRA.

An Example Wireless Communication System

Figure 1:
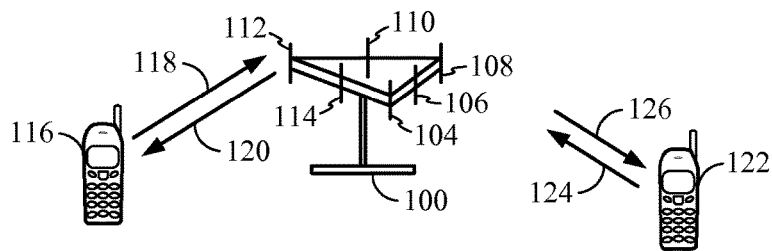
FIG. 1 illustrates an example wireless communication system according to an aspect of the present disclosure.

Referring to FIG. 1, a multiple access wireless communication system according to one embodiment is illustrated. An access point 100 (AP) includes multiple antenna groups, one including antenna 104 and antenna 106, another including antenna 108 and antenna 110, and yet another including antenna 112 and antenna 114. In FIG. 1, only two antennas are shown for each antenna group; however, more or fewer antennas may be utilized for each antenna group. Access terminal 116 (AT) is in communication with antennas 112 and 114, where antennas 112 and 114 transmit information to access terminal 116 over forward link 120 and receive information from access terminal 116 over reverse link 118. Access terminal 122 is in communication with antennas 106 and 108, where antennas 106 and 108 transmit information to access terminal 122 over forward link 126 and receive information from access terminal 122 over reverse link 124. In an FDD system, communication links 118, 120, 124, and 126 may use different frequency for communication. For example, forward link 120 may use a different frequency then that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 utilize beamforming in order to improve the signal-to-noise ratio (SNR) of forward links for the different access terminals 116 and 122. Also, an access point using beamforming to transmit to access terminals scattered randomly through its coverage causes less interference to access terminals in neighboring cells than an access point transmitting through a single antenna to all its access terminals.

An access point (AP) may be a fixed station used for communicating with the terminals and may also be referred to as a base station (BS), a Node B, or some other terminology. An access terminal may also be called a mobile station (MS), user equipment (UE), a wireless communication device, terminal, user terminal (UT), or some other terminology.

Figure 2:
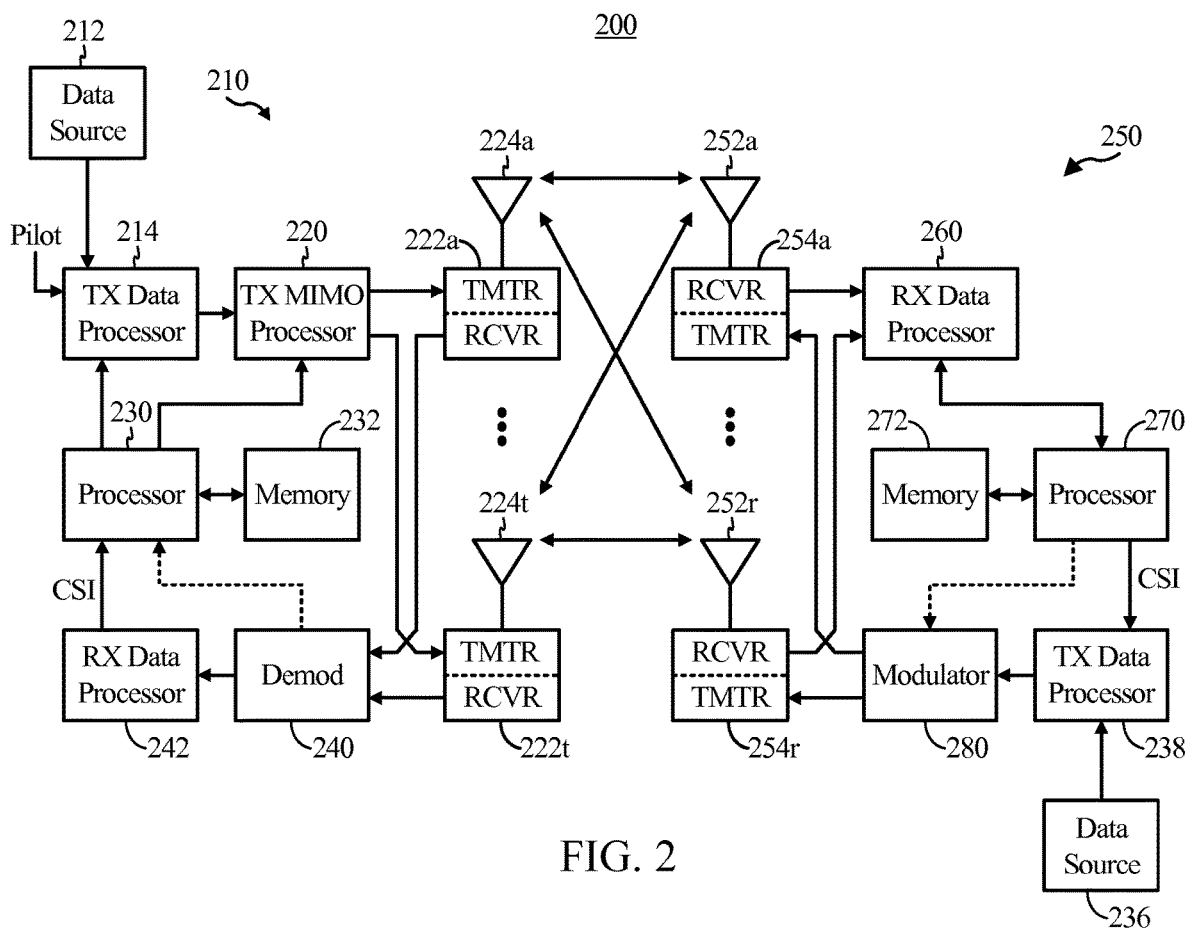
FIG. 2 is a block diagram conceptually illustrating an example of a Node B in communication with a user equipment device (UE) in a wireless communication system, according to an aspect of the present disclosure.

FIG. 2 is a block diagram of an embodiment of a transmitter system 210 (also known as an access point) and a receiver system 250 (also known as an access terminal) in a MIMO system 200. At the transmitter system 210, traffic data for a number of data streams is provided from a data source 212 to a transmit (TX) data processor 214.

In an aspect, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At receiver system 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use. Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210.

At transmitter system 210, the modulated signals from receiver system 250 are received by antennas 224, conditioned by receivers 222, demodulated by a demodulator 240, and processed by a RX data processor 242 to extract the reserve link message transmitted by the receiver system 250. Processor 230 then determines which pre-coding matrix to use for determining the beamforming weights and then processes the extracted message.

In an aspect, logical channels are classified into Control Channels and Traffic Channels. Logical Control Channels comprise Broadcast Control Channel (BCCH) which is a DL channel for broadcasting system control information. Paging Control Channel (PCCH) is a DL channel that transfers paging information. Multicast Control Channel (MCCH) is a point-to-multipoint DL channel used for transmitting Multimedia Broadcast and Multicast Service (MBMS) scheduling and control information for one or several MTCHs. Generally, after establishing an RRC connection, this channel is only used by UEs that receive MBMS (Note: old MCCH+MSCH). Dedicated Control Channel (DCCH) is a point-to-point bi-directional channel that transmits dedicated control information used by UEs having an RRC connection. In an aspect, Logical Traffic Channels comprise a Dedicated Traffic Channel (DTCH), which is a point-to-point bi-directional channel, dedicated to one UE, for the transfer of user information. Also, a Multicast Traffic Channel (MTCH) is a point-to-multipoint DL channel for transmitting traffic data.

In an aspect, Transport Channels are classified into DL and UL. DL Transport Channels comprise a Broadcast Channel (BCH), Downlink Shared Data Channel (DL-SDCH), and a Paging Channel (PCH), the PCH for support of UE power saving (DRX cycle is indicated by the network to the UE), broadcasted over entire cell and mapped to PHY resources which can be used for other control/traffic channels. The UL Transport Channels comprise a Random Access Channel (RACH), a Request Channel (REQCH), an Uplink Shared Data Channel (UL-SDCH), and a plurality of PHY channels. The PHY channels comprise a set of DL channels and UL channels.

The DL PHY channels comprise:
Common Pilot Channel (CPICH)
Synchronization Channel (SCH)
Common Control Channel (CCCH)
Shared DL Control Channel (SDCCH)
Multicast Control Channel (MCCH)
Shared UL Assignment Channel (SUACH)
Acknowledgement Channel (ACKCH)
DL Physical Shared Data Channel (DL-PSDCH)
UL Power Control Channel (UPCCH)
Paging Indicator Channel (PICH)
Load Indicator Channel (LICH)
The UL PHY Channels comprise:
Physical Random Access Channel (PRACH)
Channel Quality Indicator Channel (CQICH)
Acknowledgement Channel (ACKCH)
Antenna Subset Indicator Channel (ASICH)
Shared Request Channel (SREQCH)
UL Physical Shared Data Channel (UL-PSDCH)
Broadband Pilot Channel (BPICH)
In an aspect, a channel structure is provided that preserves low PAR (at any given time, the channel is contiguous or uniformly spaced in frequency) properties of a single carrier waveform.

Figure 3:
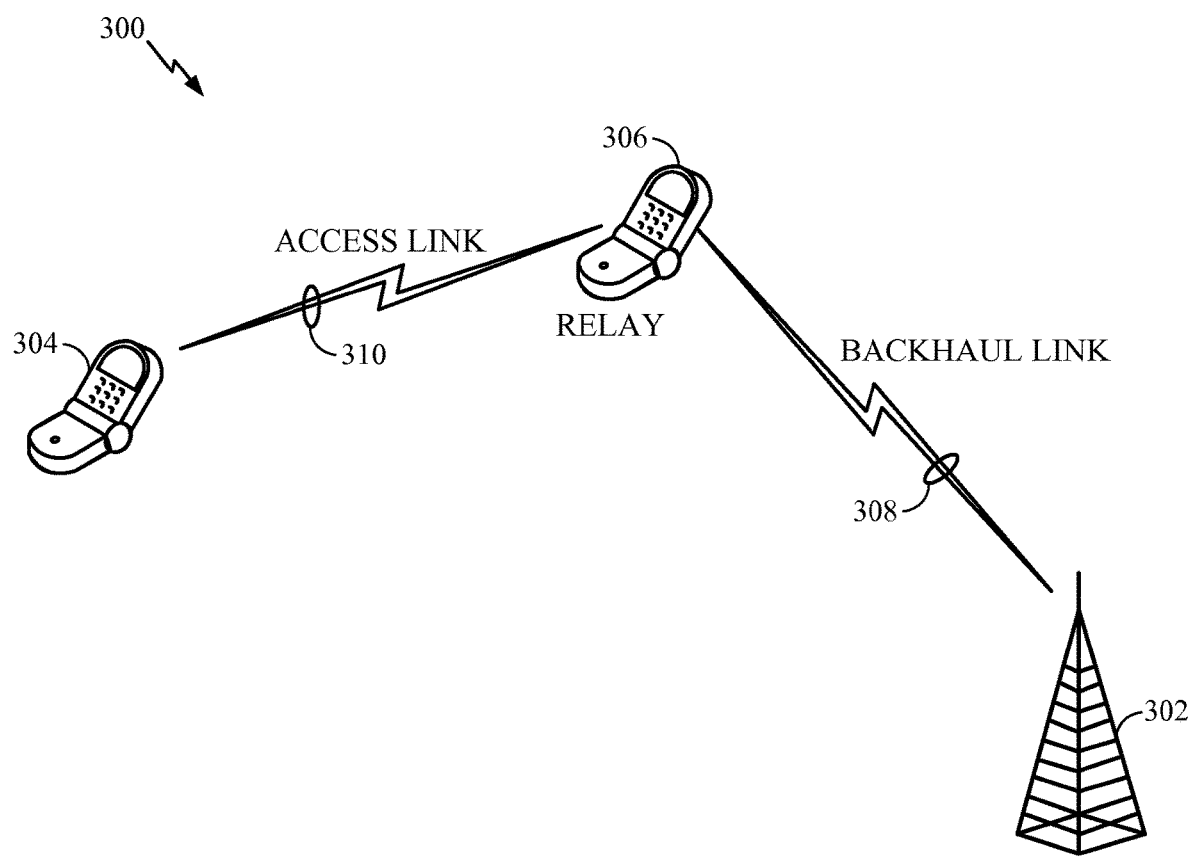
FIG. 3 illustrates an example wireless communications system with a relay UE according to an aspect of the present disclosure.

For the purposes of the present document, the following abbreviations apply:
AM Acknowledged Mode
AMD Acknowledged Mode Data
ARQ Automatic Repeat Request
BCCH Broadcast Control CHannel
BCH Broadcast CHannel
C- Control-
CCCH Common Control CHannel
CCH Control CHannel
CCTrCH Coded Composite Transport Channel
CP Cyclic Prefix
CRC Cyclic Redundancy Check
CTCH Common Traffic CHannel
DCCH Dedicated Control CHannel
DCH Dedicated CHannel
DL DownLink
DSCH Downlink Shared CHannel DTCH Dedicated Traffic CHannel
FACH Forward link Access CHannel
FDD Frequency Division Duplex
L1 Layer 1 (physical layer)
L2 Layer 2 (data link layer)
L3 Layer 3 (network layer)
LI Length Indicator
LSB Least Significant Bit
MAC Medium Access Control
MBMS Multimedia Broadcast Multicast Service
MCCH MBMS point-to-multipoint Control CHannel
MRW Move Receiving Window
MSB Most Significant Bit
MSCH MBMS point-to-multipoint Scheduling CHannel
MTCH MBMS point-to-multipoint Traffic CHannel
PCCH Paging Control CHannel
PCH Paging CHannel
PDU Protocol Data Unit
PHY PHYsical layer
PhyCH Physical CHannels
RACH Random Access CHannel
RB Resource Block
RLC Radio Link Control
RRC Radio Resource Control
SAP Service Access Point
SDU Service Data Unit
SHCCH SHared channel Control CHannel
SN Sequence Number
SUFI SUper FIeld
TCH Traffic CHannel
TDD Time Division Duplex
TFI Transport Format Indicator
TM Transparent Mode
TMD Transparent Mode Data
TTI Transmission Time Interval
U- User-
UE User Equipment
UL UpLink
UM Unacknowledged Mode
UMD Unacknowledged Mode Data
UMTS Universal Mobile Telecommunications System
UTRA UMTS Terrestrial Radio Access
UTRAN UMTS Terrestrial Radio Access Network
MBSFN multicast broadcast single frequency network
MCE MBMS coordinating entity
MCH multicast channel
DL-SCH downlink shared channel
MSCH MBMS control channel
PDCCH physical downlink control channel
PDSCH physical downlink shared channel An Example Relay System FIG. 3 illustrates an example wireless system 300 in which certain aspects of the present disclosure may be practiced. As illustrated, the system 300 includes a donor base station (BS) 302 (also known as donor access point or a donor evolved Node B (DeNB)) that communicates with a user equipment (UE) 304 via a relay node 306 (also known as a relay station or a relay). While the relay node 306 may comprise a relay base station (also known as a relay eNB), a UE (e.g., a cell phone) may also function as a relay for relaying transmissions for other UEs, as shown in FIG. 3. Such relays may be known as relay UEs, UE relays, Layer 2 (L2) UE relays or L2 relay UEs.

The relay node 306 may communicate with the donor BS 302 via a backhaul link 308 and with the UE 304 via an access link 310. In other words, the relay node 306 may receive downlink messages from the donor BS 302 over the backhaul link 308 and relay these messages to the UE 304 over the access link 310. Similarly, the relay node 306 may receive uplink messages from the UE 304 over the access link 310 and relay these messages to the donor BS 302 over the backhaul link 308. In this manner, the relay node 306 may, thus, be used to supplement a coverage area and help fill "coverage holes."

LTE Relay Ues in Unlicensed Spectrums

A given radio access technology (RAT) may involve operation in the licensed spectrum for that RAT. However, the use of UE relays may allow operation in the unlicensed spectrum for communications between a UE relay and its associated terminal UEs via the access link 310.

Figure 4:
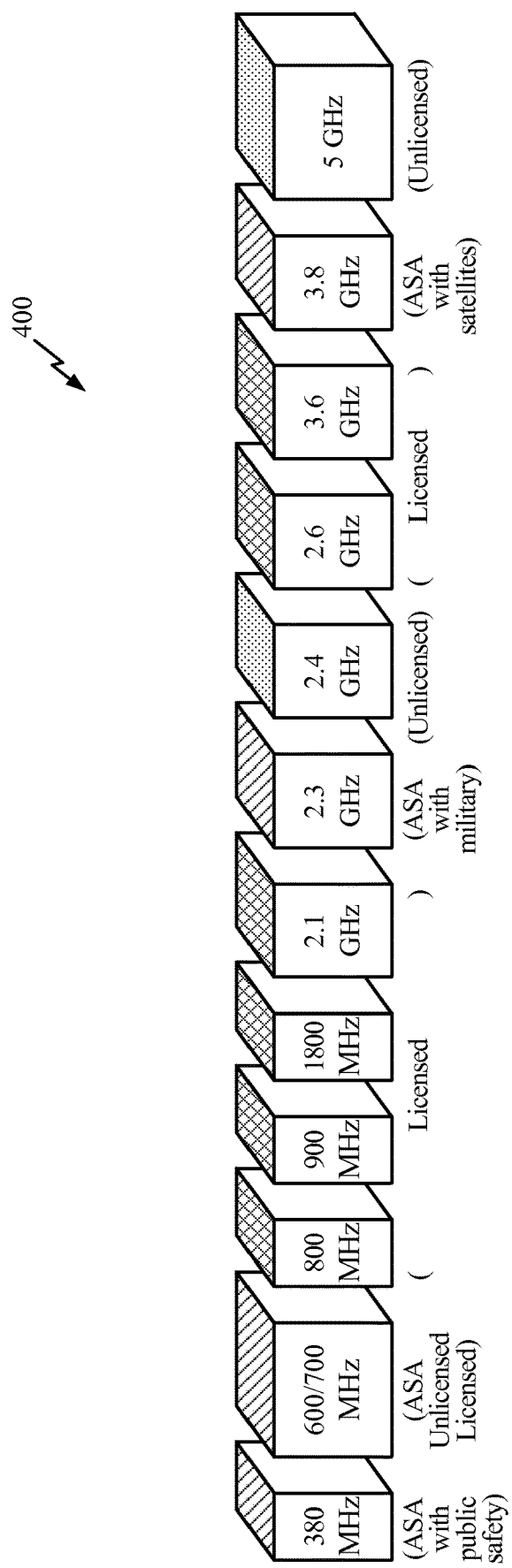
FIG. 4 illustrates example unlicensed and licensed frequency bands in a frequency spectrum for wireless communications, according to an aspect of the present disclosure.

For example, FIG. 4 illustrates example unlicensed and licensed frequency bands in a frequency spectrum 400 for wireless communications. For example, the unlicensed spectrum may include the television white space (TVWS) at around 600 MHz. Aspects of the present disclosure pertain to utilizing the unlicensed spectrums, as well as the authorized shared access (ASA) spectrums in the access link 310.

Utilizing the unlicensed spectrum in the access link may increase data throughput and/or spectral efficiency, even though the UE relays may communicate with the eNB via the backhaul link 308 in the licensed spectrum. Several issues may arise from utilizing the unlicensed spectrum in this manner. For example, LTE relay UEs and terminal UEs of one operator may interfere with or be interfered by non-cooperating devices operating in the same spectrum, such as WiFi devices and LTE devices associated with a different operator.

Accordingly, what is needed are techniques and apparatus for eliminating, or at least reducing, interference from non-cooperating devices operating in the same spectrum.

Certain aspects of the present disclosure provide several techniques to avoid or at least mitigate interference from such non-cooperating devices. These techniques may include: (1) determining unlicensed access link LTE duplexing between an LTE relay UE and LTE terminal (e.g., based on the presence of other devices, the number of unlicensed channels available, etc.; (2) determining access link channel usage (e.g., based on channel occupancy by non-LTE devices such as WiFi devices and other LTE devices associated with different operators; and (3) managing X2-based interference based on having a wireless and/or wired backhaul link 308.

Figure 5:
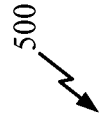
FIG. 5 is a table of example system scenarios involving relay UEs, the scenarios consisting of either a licensed wireless or wired backhaul link and an unlicensed access link, according to an aspect of the present disclosure.

FIG. 5 is a table 500 of example system scenarios involving relay UEs. Five scenarios (1, 2, 1G, 3, and 4) are shown, which will be described in greater detail below. These scenarios may involve a wired or a wireless backhaul link 308 and relay UEs (which may be referred to as "MyLTE hotspot devices") associated with the same or different operators. The access devices (e.g., terminal UEs) may also be associated with the same or different operators.

Scenario 1

Figure 6:
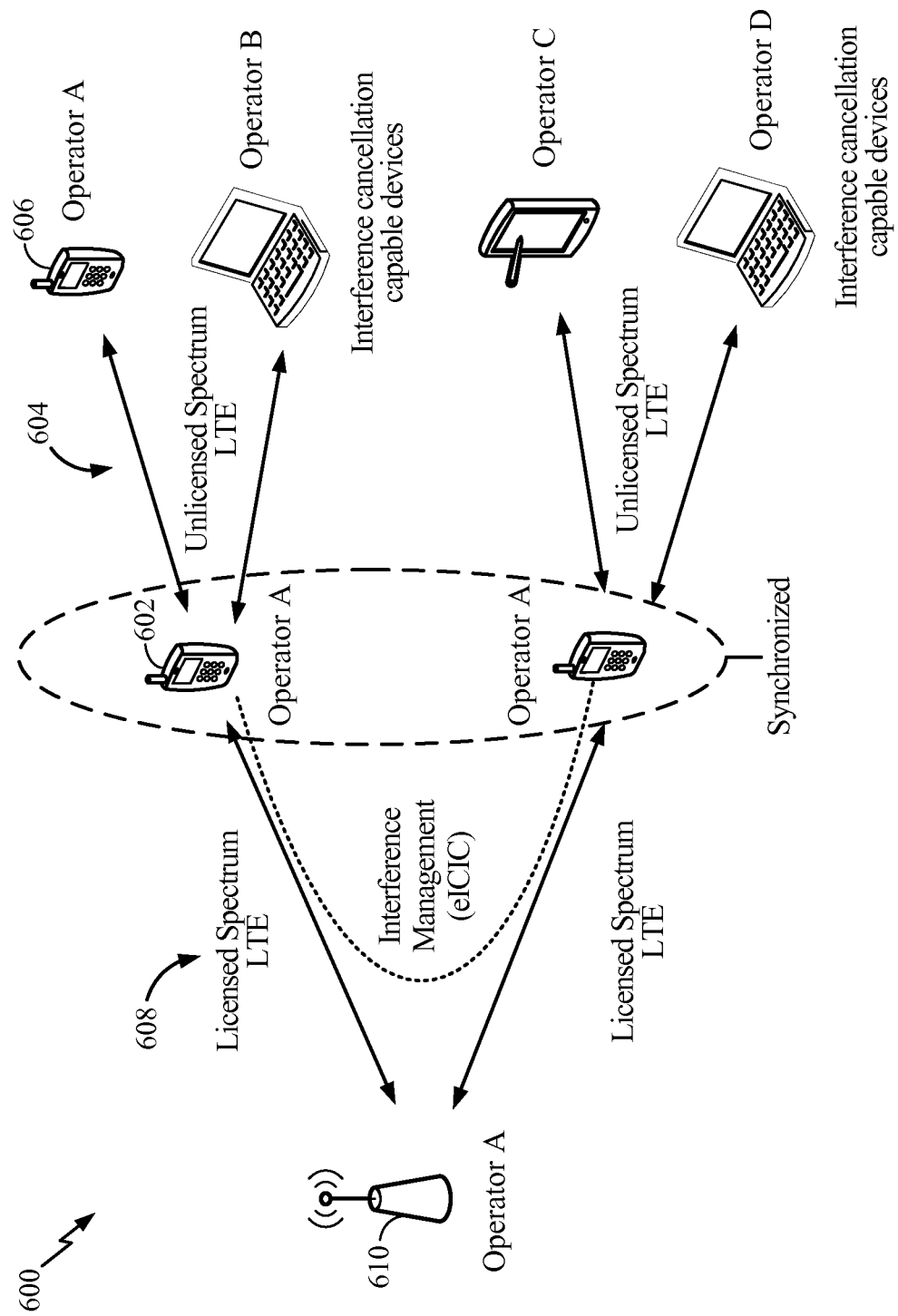
FIG. 6 illustrates an example system scenario involving relay UEs with a wireless backhaul link, a single operator, synchronization via a base station, and an unlicensed access link, according to an aspect of the present disclosure.

FIG. 6 illustrates an example system scenario 600 comprising two LTE relay UEs 602 associated with the same operator (Operator A). Each relay UE 602 may communicate with one or more terminal UEs 606 via a wireless access link 604 utilizing the unlicensed spectrum. The relay UEs 602 may communicate with the eNB 610 (also associated with Operator A) via a wireless backhaul link 608 using the licensed spectrum for LTE. Communications via the backhaul link 608 may employ time-division duplexing (TDD) or frequency-division duplexing (FDD).

The two relay UEs 602 may be time synchronized. For example, the relay UEs 602 may synchronize their timing by deriving timing from either the same eNB or from multiple synchronous eNBs.

When the two relay UEs 602 operate in relay mode, interference management may be coordinated by a macro cell. Also, the relay UEs may perform coordinated multipoint (CoMP) techniques such as coordinated beamforming or spatial multiplexing to the same access device (e.g., a terminal UE 606).

When the two relay UEs 602 operate in hotspot mode, interference management may be accomplished over a wireless X2 interface (e.g., the backhaul link 608). Furthermore, time-division multiplexing (TDM) adaptive resource partitioning may also be negotiated over the wireless X2 interface.

For certain aspects, access devices (e.g., the terminal UEs 606) associated with different operators may be linked with a single relay UE 602. Communications via the access link 604 may use TDD by default, but FDD operations may also be used in certain RF scenarios. Use of either duplexing mode (TDD or FDD) may be negotiated between the relay UE 602 and the access device.

For certain aspects, access devices may have advanced receivers capable of cancelling downlink interference emanating from non-serving relay UEs 602. For example, interfering broadcast signals such as the primary synchronization signal (PSS), the secondary synchronization signal (SSS), the physical broadcast channel (PBCH), and/or the reference signal (RS) may be canceled in nominal heterogeneous network (HetNet) operation. In more advanced HetNet operation, the physical downlink shared channel (PDSCH), the packet data control channel (PDCCH), the physical HARQ indicator channel (PHICH), and/or the physical control format indicator channel (PCFICH) may be canceled when interfering.

Scenario 2

Figure 7:
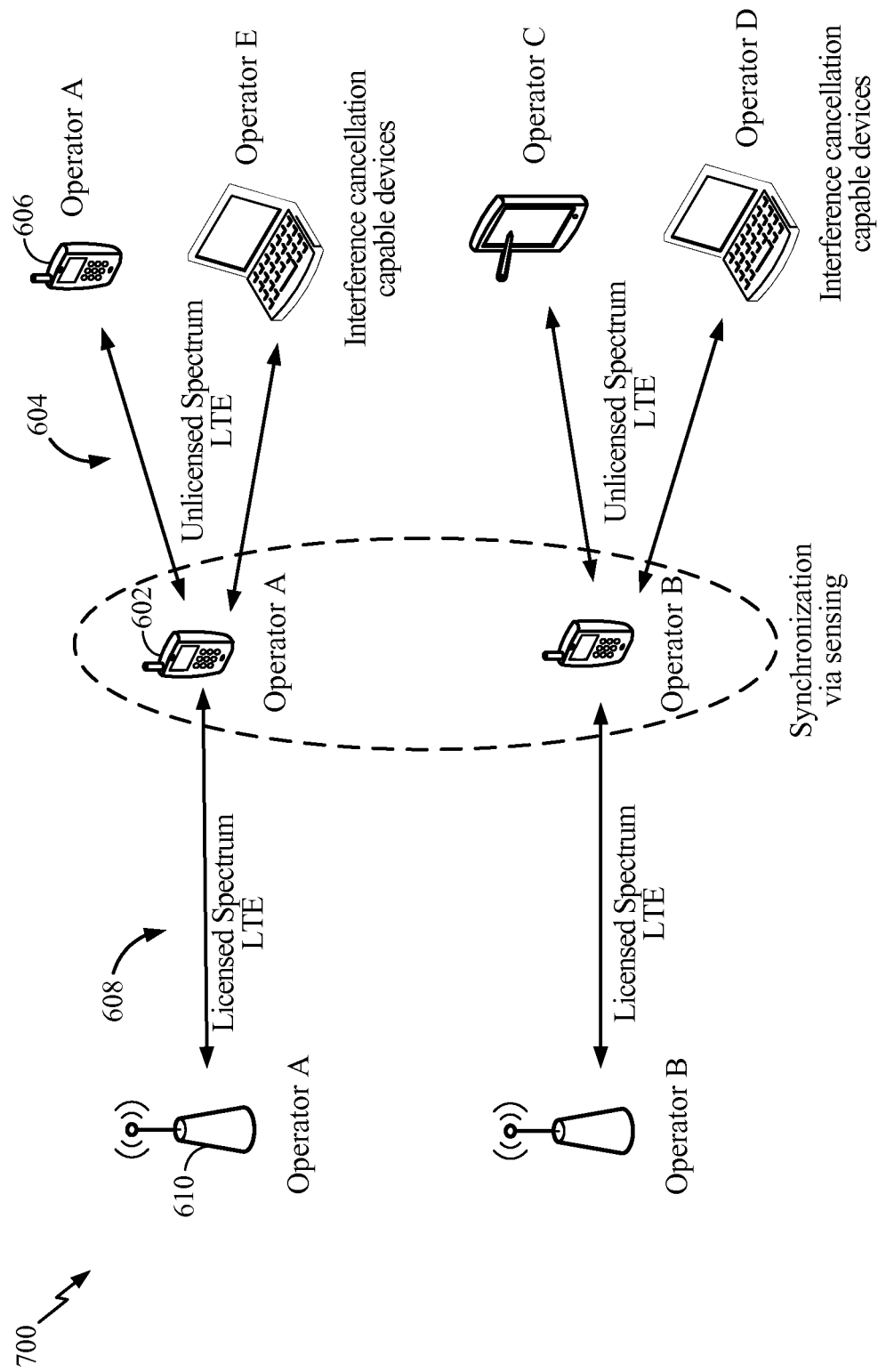
FIG. 7 illustrates an example system scenario involving relay UEs with a licensed wireless backhaul link, different operators, synchronization via sensing, and an unlicensed access link, according to an aspect of the present disclosure.

FIG. 7 illustrates an example system scenario 700 comprising a wireless backhaul link 608 and two LTE relay UEs 602 associated with different operators (Operator A and Operator B). The relay UE 602 associated with Operator A may communicate with the eNB 610 associated with Operator A, while the relay UE 602 associated with Operator B may communicate with the eNB 610 associated with Operator B. Communications via the backhaul link 608 may employ TDD or FDD.

As far as timing is concerned, the relay UEs 602 may derive their primary timing from their respective eNBs 610 via the backhaul link 608. For the access link 604, a particular relay UE 602 may scan (e.g., sense) the unlicensed spectrum for downlink transmissions by other relay UEs (other MyLTE devices) and then synchronize access link timing in a given unlicensed channel to the downlink timing of the dominant MyLTE interferer (associated with the other operator) in that channel.

When the two relay UEs 602 operate in hotspot mode, interference management may be accomplished using frequency-division multiplexing (FDM). For example, the relay UE 602 may select an unlicensed access channel based on minimal interference from non-LTE (e.g., WiFi) devices, as well as LTE devices associated with different operators.

For certain aspects, access devices (e.g., the terminal UEs 606) associated with different operators may be linked with a single relay UE 602. Communications via the access link 604 may use TDD by default, but FDD operations may also be used in certain RF scenarios. Use of either duplexing mode (TDD or FDD) may be negotiated between the relay UE 602 and the access device during setup.

For certain aspects, access devices may have advanced receivers capable of cancelling downlink interference emanating from non-serving relay UEs 602. For example, interfering broadcast signals such as PSS/SSS, PBCH, and/or RS may be canceled in nominal HetNet operation. In more advanced HetNet operation, PDSCH, the PDCCH, PHICH, and/or PCFICH may be canceled when interfering. The non-serving relay UEs 602 may be associated with different operators in the backhaul link, but this is transparent to interference cancellation operation.

Scenario 1G

Figure 8:
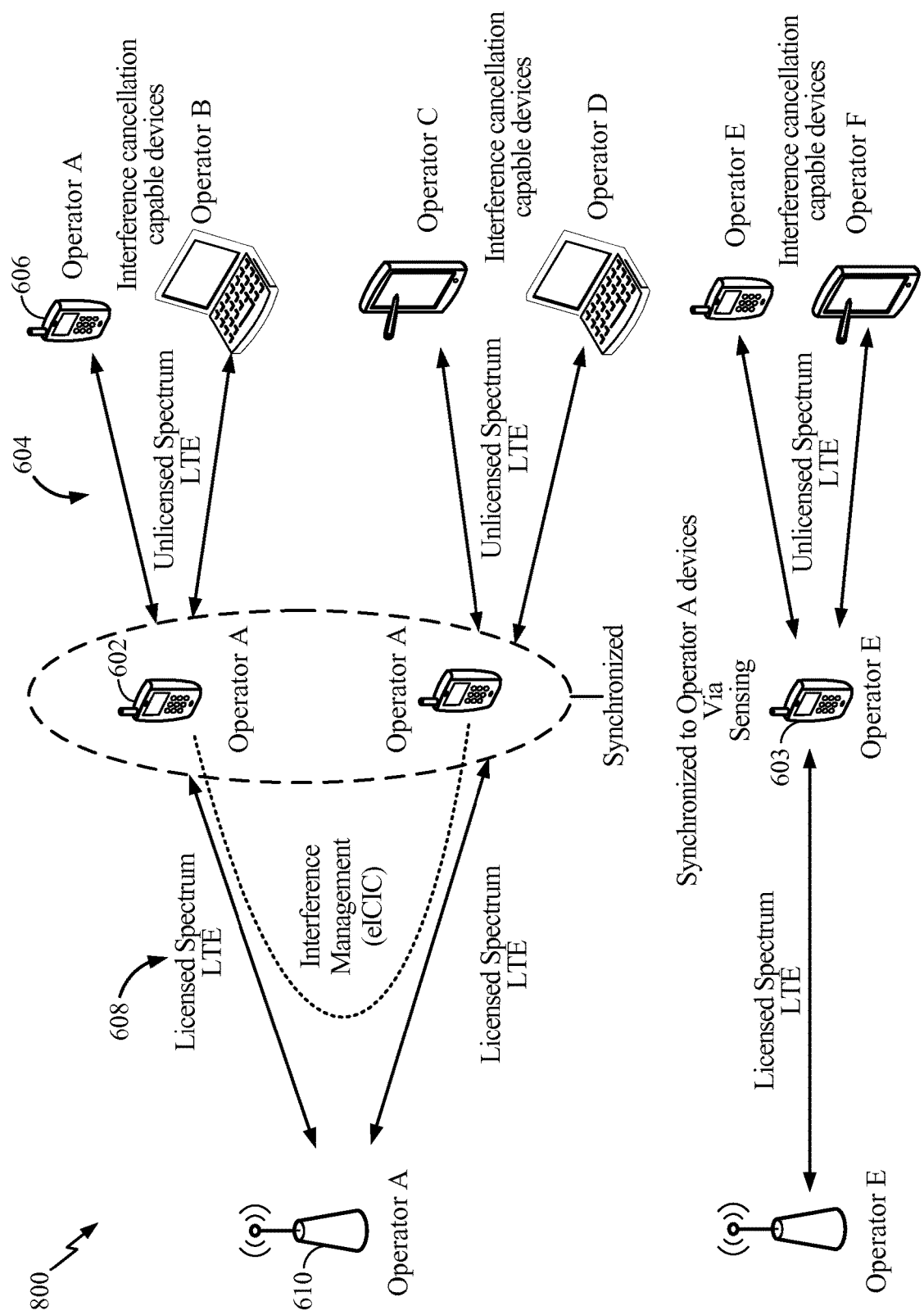
FIG. 8 illustrates an example system scenario involving relay UEs with a licensed wireless backhaul link, both shared and different operators, synchronization both via a base station and via sensing, and an unlicensed access link, according to an aspect of the present disclosure.

FIG. 8 illustrates an example system scenario 800 comprising a wireless backhaul 608, two LTE relay UEs 602 associated with the same operator (Operator A), and a third LTE relay UE 603 associated with a different operator (Operator E). Basically, this scenario 800 combines scenarios 600 and 700 from FIGS. 6 and 7. The two relay UEs 602 associated with Operator A may communicate with the eNB 610 associated with Operator A, while the third relay UE 603 associated with Operator E may communicate with the eNB associated with Operator E.

As far as timing is concerned, the relay UEs 602 may derive their backhaul timing from their respective eNBs 610 via the backhaul link 608. The relay UE associated with Operator E may rely on scanning/sensing in the access link 604 for its timing, as described above with respect to FIG. 7.

In FIG. 8, relay mode may be used for communications between relay UEs 602 and terminal UEs 606 associated with the same operator. Hotspot mode may be used for communications between relay UEs 602, 603 and terminal UEs 606 associated with different operators.

Scenario 3

Figure 9:
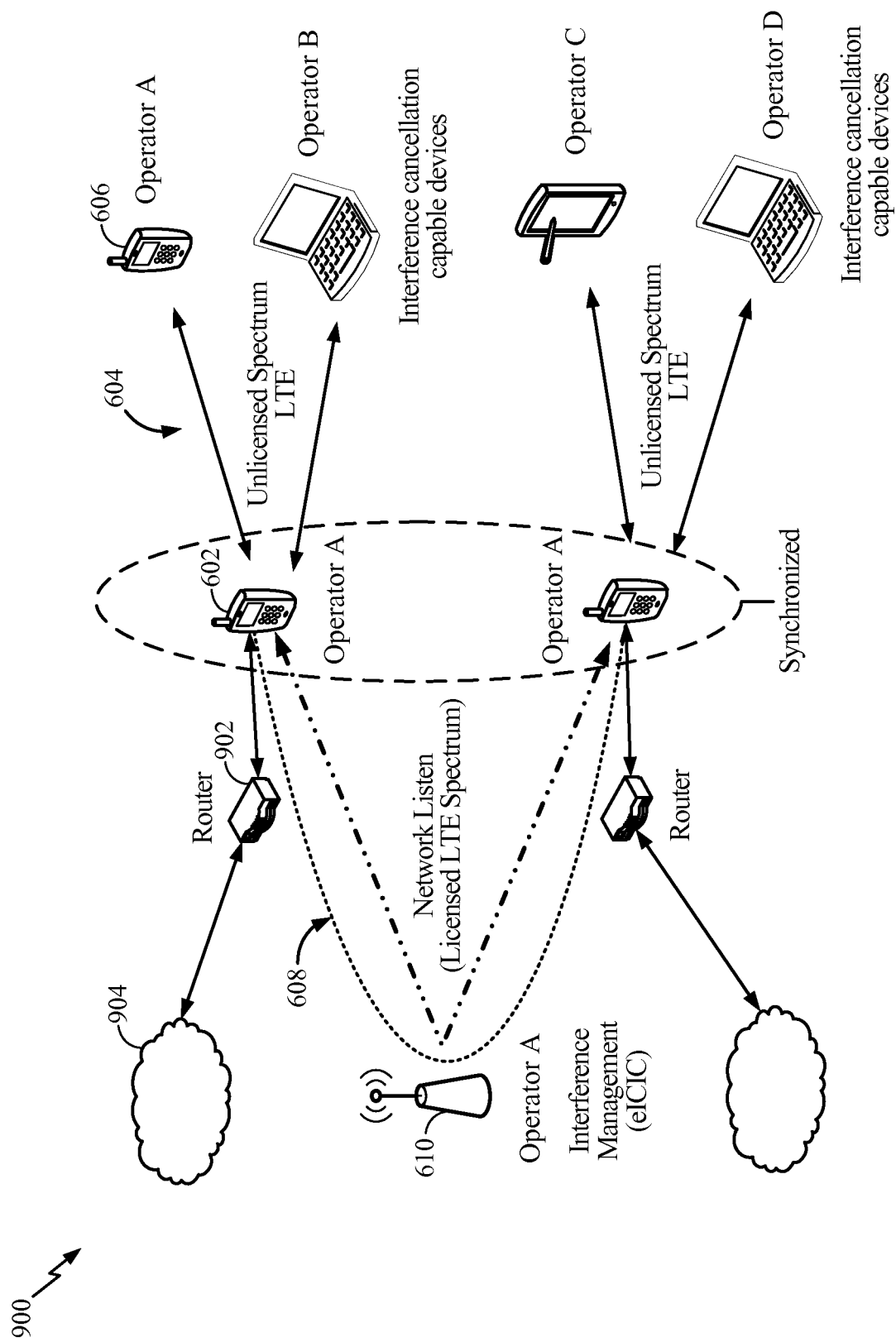
FIG. 9 illustrates an example system scenario involving relay UEs with a licensed wired backhaul link, a single operator, synchronization via a base station, and an unlicensed access link, according to an aspect of the present disclosure.

FIG. 9 illustrates an example system scenario 900 comprising a wired backhaul link 608 and two LTE relay UEs 602 associated with the same operator (Operator A). For the wired backhaul link, the relay UEs 602 may communicate with a network 904 (e.g., the Internet) via a home router 902. The relay UEs 602 may be time synchronized by deriving their timing from the same eNB 610 or from multiple synchronous eNBs. This scenario 900 may involve using hotspot mode only, where interference management may be accomplished using FDM. Operation of the relay UEs 602 may be transparent to the access devices.

Scenario 4

Figure 10:
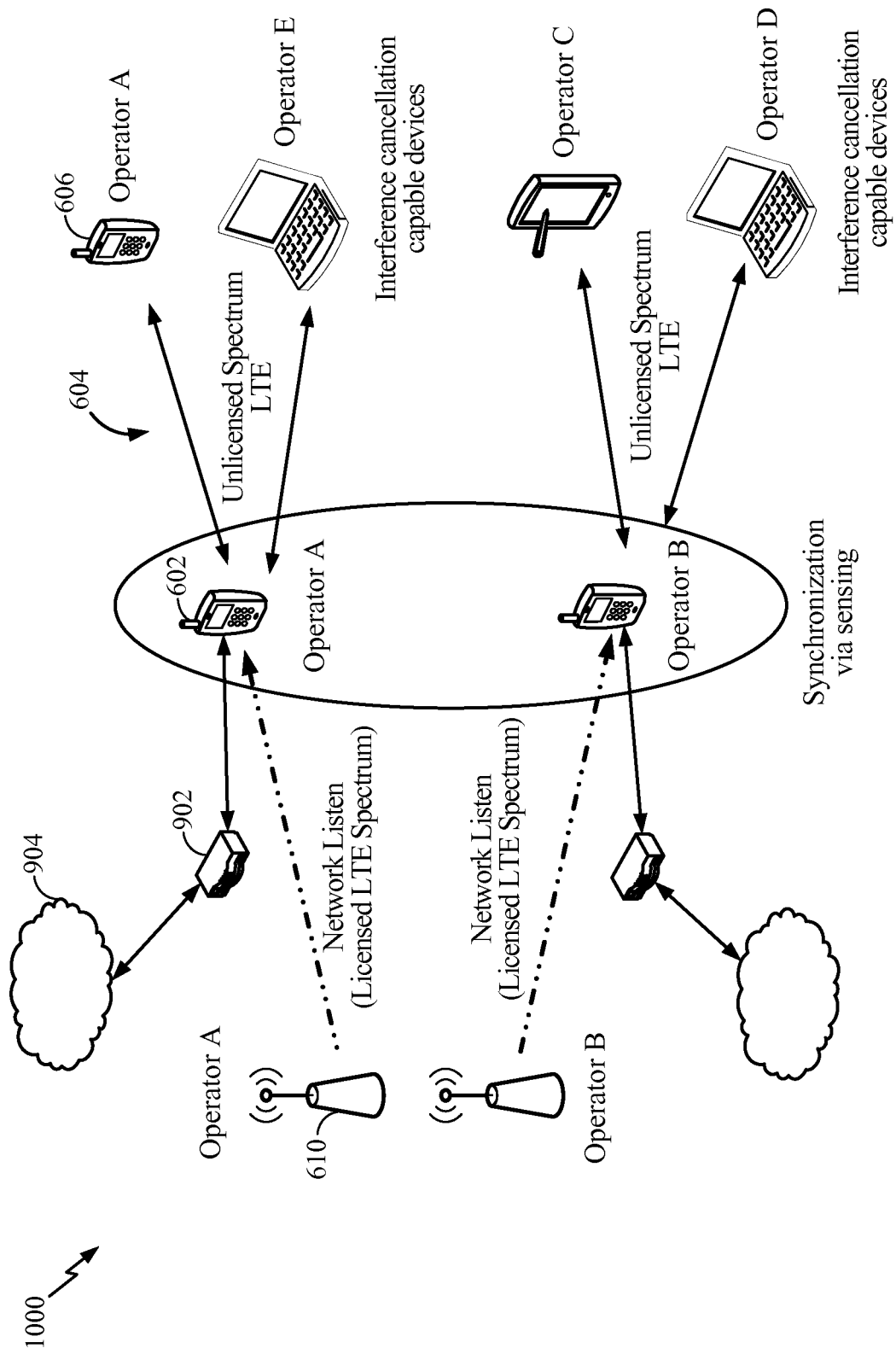
FIG. 10 illustrates an example system scenario involving relay UEs with a licensed wired backhaul link, different operators, synchronization via sensing, and an unlicensed access link, according to an aspect of the present disclosure.

FIG. 10 illustrates an example system scenario 1000 comprising a wired backhaul link 608 and two LTE relay UEs 602 associated with different operators (Operator A and Operator B). The relay UE 602 associated with Operator A may communicate with the eNB 610 associated with Operator A, while the relay UE 602 associated with Operator B may communicate with the eNB 610 associated with Operator B. For the wired backhaul link, the relay UEs 602 may communicate with a network 904 (e.g., the Internet) via a home router 902.

This scenario 1000 is similar to scenarios 700 and 900 in FIGS. 7 and 9. Hence, the relay UEs 602 may be time synchronized similar to synchronization described with respect to scenario 700. Also, the absence of a common node in the backhaul makes scenarios 900 and 1000 very similar in operation. In hotspot mode, interference management may be accomplished using FDM. Operation of the relay UEs 602 may be transparent to the access devices.

Figure 11:
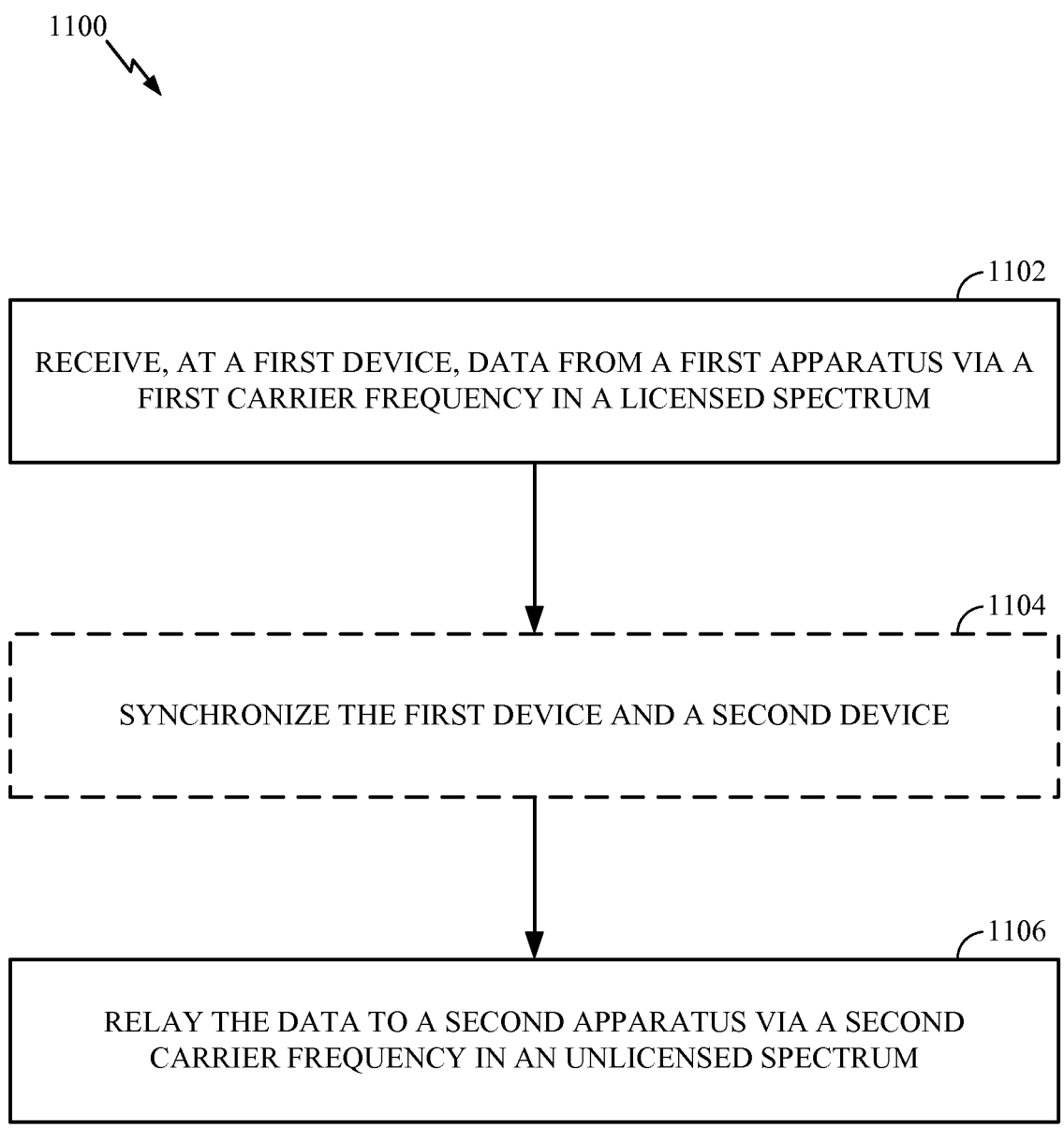
FIG. 11 is a flow diagram of example operations for relaying data from the perspective of a relaying device, for example, according to an aspect of the present disclosure.

FIG. 11 is a flow diagram of example operations 1100 for relaying data. The operations 1100 may be performed, for example, by a first device, where the first device is a relaying device (e.g., a UE functioning as a relay). At 1102, the first device may receive data from a first apparatus via a first carrier frequency in a licensed spectrum. For certain aspects, the first apparatus may comprise an eNB. At 1104, the first device and a second device may be synchronized for certain aspects. For example, the second device may also be a relaying device (e.g., a UE functioning as a relay). For other aspects, the second device may be an eNB, a non-relaying UE, or some other communications network device. At 1106, the first device may relay the received data to a second apparatus, in the downlink direction, via a second carrier frequency in an unlicensed spectrum. For certain aspects, the second apparatus may be a terminal UE being served by the first device.

As described above, the first device and a second device (which may also function as a relay) may be synchronized. In such cases, the first device may relay the received data to the second apparatus at 1106 based on this synchronization. If the first and second devices are associated with the same operator (e.g., as in Scenarios 1 and 3 above), this synchronization may involve deriving timing from the first apparatus, such that the first and second devices are synchronized to the first apparatus. If the first device is associated with a first operator and the second device is associated with a second operator different from the first operator (e.g., as in Scenarios 2 and 4 above), the synchronization may entail scanning the unlicensed spectrum for downlink transmissions by the second device to determine a downlink timing and synchronizing an access link timing of transmissions to the second apparatus according to the downlink timing of the second device. For certain aspects, the first and second devices may function as wireless access points (APs) (e.g., as in Scenarios 3 and 4 above), and each may be connected with a network router.

According to certain aspects, the relaying at 1106 may be coordinated with the second device. The coordination between the first and second devices may include coordinated beamforming or spatial multiplexing.

For certain aspects, interference management of the first device may be coordinated by the first apparatus. The interference management may involve receiving resource partitioning information (RPI) from the first apparatus in an effort to avoid interference with at least one of the second device or another device. This interference management may be performed after the synchronization between the first and second devices.

For certain aspects, the first device may negotiate, with the second apparatus, a duplexing mode for the relaying at 1106. The negotiated duplexing mode may include time-division duplexing (TDD) or frequency-division duplexing (FDD). For the negotiation, the first device may consider at least one of a number of channels available in the unlicensed spectrum and the presence of apparatuses other than the first and second apparatuses. The relaying may involve using the negotiated duplexing mode.

For certain aspects, the first device may determine the second carrier frequency based on interference from devices using radio access technologies (RATs) different from a RAT used by the first device or from devices using the same RAT as, but associated with a different operator than, the first device.

According to certain aspects, the first device may receive other data from the second apparatus via the second carrier frequency in the unlicensed spectrum. The first device may then relay the other data to the first apparatus, in the uplink direction, via the first carrier frequency in the licensed spectrum.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in the Figures, those operations may have corresponding counterpart means-plus-function components.

For example, means for transmitting, means for relaying, or means for negotiating may comprise a transmitter (e.g., a transmitter 222) and/or an antenna 224 of the transmitter system 210 or a transmitter (e.g., a transmitter 254) and/or an antenna 252 of the receiver system 250 illustrated in FIG. 2. Means for receiving or means for negotiating may comprise a receiver (e.g., a receiver 254) and/or an antenna 252 of the receiver system 250 or a receiver (e.g., a receiver 222) and/or an antenna 224 of the transmitter system 210 illustrated in FIG. 2. Means for processing, means for determining, means for synchronizing, means for negotiating, or means for selecting may comprise a processing system, which may include at least one processor, such as the RX data processor 260, the processor 270, and/or the TX data processor 238 of the receiver system 250 or the RX data processor 242, the processor 230, and/or the TX data processor 214 of the transmitter system 210 illustrated in FIG. 2.

It is understood that the specific order or hierarchy of steps in the processes disclosed is an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method for wireless communications, comprising:
   receiving, at a first device, data from a first apparatus via a first carrier frequency in a licensed spectrum, wherein the first device comprises a relaying device;
   scanning, by the first device, an unlicensed spectrum for downlink transmissions by a second device;
   determining, by the first device, downlink timing of the second device based on scanning the unlicensed spectrum;
   determining, by the first device, an access link timing of transmissions to a second apparatus according to the downlink timing of the second device determined by the first device;
   relaying the data to the second apparatus via a second carrier frequency in the unlicensed spectrum, based on the access link timing;
   receiving, at the first device, other data from the second apparatus via the second carrier frequency in the unlicensed spectrum; and
   relaying the other data to the first apparatus via the first carrier frequency in the licensed spectrum.

2. The method of claim 1, wherein the first device comprises a user equipment (UE) functioning as a relay.

3. The method of claim 1, wherein the first device is associated with a first operator, and wherein the second device is associated with a second operator different from the first operator.

4. The method of claim 1, wherein the first and second devices function as access points (APs) and are each connected with a router.

5. The method of claim 1, wherein the relaying of the data is coordinated with the second device, and the coordination between the first and second devices comprises at least one of coordinated beamforming or spatial multiplexing.

6. The method of claim 1, further comprising negotiating, with the second apparatus, a duplexing mode for the relaying of the data, wherein the relaying of the data comprises using the negotiated duplexing mode.

7. The method of claim 6, wherein the negotiated duplexing mode comprises frequency-division duplexing (FDD).

8. The method of claim 6, wherein the negotiating comprises considering at least one of a number of channels available in the unlicensed spectrum or presence of apparatuses other than the first and second apparatuses.

9. The method of claim 1, wherein interference management of the first device is coordinated by the first apparatus.

10. The method of claim 9, wherein the interference management comprises receiving resource partitioning information from the first apparatus to avoid interference with at least one of the second device or another device.

11. The method of claim 1, further comprising determining the second carrier frequency based on interference from devices using radio access technologies (RATs) different from a RAT used by the first device or from devices using the same RAT as, but associated with a different operator than, the first device.

12. A first device for wireless communications, wherein the first device is a relaying device, the first device comprising:
   a receiver configured to receive data from a first apparatus via a first carrier frequency in a licensed spectrum;
   a processing system configured to:
      scan an unlicensed spectrum for downlink transmissions by a second device,
      determine downlink timing of the second device based on scanning the unlicensed spectrum, and
      determine an access link timing of transmissions to a second apparatus according to the downlink timing of the second device; and
   a transmitter configured to relay the data to the second apparatus via a second carrier frequency in the unlicensed spectrum, based on the access link timing, wherein:
      the receiver is further configured to receive other data from the second apparatus via the second carrier frequency in the unlicensed spectrum; and
      the transmitter is further configured to relay the other data to the first apparatus via the first carrier frequency in the licensed spectrum.

13. The first device of claim 12, wherein the first device comprises a user equipment (UE) functioning as a relay.

14. The first device of claim 12, wherein the first device is associated with a first operator and wherein the second device is associated with a second operator different from the first operator.

15. The first device of claim 12, wherein the first and second devices function as access points (APs) and are each connected with a router.

16. The first device of claim 12, wherein the transmitter is configured to relay the data to the second apparatus in coordination with the second device and wherein the coordination between the first and second devices comprises at least one of coordinated beamforming or spatial multiplexing to the second apparatus.

17. The first device of claim 12, wherein the processing system is further configured to negotiate, with the second apparatus, a duplexing mode for the relaying of the data, wherein the transmitter is configured to relay the data using the negotiated duplexing mode.

18. The first device of claim 17, wherein the negotiated duplexing mode comprises frequency-division duplexing (FDD).

19. The first device of claim 17, wherein the processing system is configured to negotiate by considering at least one of a number of channels available in the unlicensed spectrum or presence of apparatuses other than the first and second apparatuses.

20. The first device of claim 12, wherein interference management of the first device is coordinated by the first apparatus.

21. The first device of claim 20, wherein the receiver is further configured to receive, for the interference management, resource partitioning information from the first apparatus to avoid interference with at least one of the second device or another device.

22. The first device of claim 12, wherein the processing system is further configured to determine the second carrier frequency based on interference from devices using radio access technologies (RATs) different from a RAT used by the first device or from devices using the same RAT as, but associated with a different operator than, the first device.

23. A first device for wireless communications, wherein the first device is a relaying device, the first device comprising:
    means for receiving data from a first apparatus via a first carrier frequency in a licensed spectrum;
    means for scanning an unlicensed spectrum for downlink transmissions by a second device;
    means for determining downlink timing of the second device based on scanning the unlicensed spectrum;
    means for determining an access link timing of transmissions to a second apparatus according to the downlink timing of the second device;
    means for relaying the data to the second apparatus via a second carrier frequency in the unlicensed spectrum, based on the access link timing;
    means for receiving other data from the second apparatus via the second carrier frequency in the unlicensed spectrum; and
    means for relaying the other data to the first apparatus via the first carrier frequency in the licensed spectrum.

24. The first device of claim 23, wherein the first device comprises a user equipment (UE) functioning as a relay.

25. The first device of claim 23, wherein the first device is associated with a first operator, and wherein the second device is associated with a second operator different from the first operator.

26. The first device of claim 23, wherein the first and second devices function as access points (APs) and are each connected with a router.

27. The first device of claim 23, wherein the means for relaying the data is configured to relay the data to the second apparatus in coordination with the second device and wherein the coordination between the first and second devices comprises at least one of coordinated beamforming or spatial multiplexing to the second apparatus.

28. The first device of claim 23, further comprising means for negotiating, with the second apparatus, a duplexing mode for the relaying of the data, wherein the means for relaying the data is configured to use the negotiated duplexing mode.

29. The first device of claim 28, wherein the negotiated duplexing mode comprises frequency-division duplexing (FDD).

30. The first device of claim 28, wherein the means for negotiating is configured to consider at least one of a number of channels available in the unlicensed spectrum or presence of apparatuses other than the first and second apparatuses.

31. The first device of claim 23, wherein interference management of the first device is coordinated by the first apparatus.

32. The first device of claim 31, wherein the means for receiving the data is configured to receive, for the interference management, resource partitioning information from the first apparatus to avoid interference with at least one of the second device or another device.

33. The first device of claim 23, further comprising means for determining the second carrier frequency based on interference from devices using radio access technologies (RATs) different from a RAT used by the first device or from devices using the same RAT as, but associated with a different operator than, the first device.

34. A non-transitory computer-readable medium comprising code for:
    receiving, at a first device, data from a first apparatus via a first carrier frequency in a licensed spectrum, wherein the first device comprises a relaying device;
    scanning, by the first device, an unlicensed spectrum for downlink transmissions by a second device;
    determining, by the first device, downlink timing of the second device based on scanning the unlicensed spectrum;
    determining, by the first device, an access link timing of transmissions to a second apparatus according to the downlink timing of the second device determined by the first device;
    relaying the data to the second apparatus via a second carrier frequency in the unlicensed spectrum, based on the access link timing;
    receiving, at the first device, other data from the second apparatus via the second carrier frequency in the unlicensed spectrum; and
    relaying the other data to the first apparatus via the first carrier frequency in the licensed spectrum.

35. The non-transitory computer-readable medium of claim 34, wherein the first device comprises a user equipment (UE) functioning as a relay.

36. The non-transitory computer-readable medium of claim 34, wherein the first device is associated with a first operator, and wherein the second device is associated with a second operator different from the first operator.

37. The non-transitory computer-readable medium of claim 34, wherein the first and second devices function as access points (APs) and are each connected with a router.

38. The non-transitory computer-readable medium of claim 34, wherein the relaying of the data is coordinated with the second device, and the coordination between the first and second devices comprises at least one of coordinated beamforming or spatial multiplexing.

39. The non-transitory computer-readable medium of claim 34, further comprising code for negotiating, with the second apparatus, a duplexing mode for the relaying of the data, wherein the relaying of the data comprises using the negotiated duplexing mode.

40. The non-transitory computer-readable medium of claim 39, wherein the negotiated duplexing mode comprises frequency-division duplexing (FDD).

41. The non-transitory computer-readable medium of claim 39, wherein the negotiating comprises considering at least one of a number of channels available in the unlicensed spectrum or presence of apparatuses other than the first and second apparatuses.

42. The non-transitory computer-readable medium of claim 34, wherein interference management of the first device is coordinated by the first apparatus.

43. The non-transitory computer-readable medium of claim 42, further comprising code for receiving, for the interference management, resource partitioning information from the first apparatus to avoid interference with at least one of the second device or another device.

44. The non-transitory computer-readable medium of claim 34, further comprising code for determining the second carrier frequency based on interference from devices using radio access technologies (RATs) different from a RAT used by the first device or from devices using the same RAT as, but associated with a different operator than, the first device.

* * * * *